Nov. 1, 1966  E. HANNA  3,281,925
METHOD AND APPARATUS FOR FORMING TOOTHED PARTS
Filed June 11, 1964  3 Sheets-Sheet 1
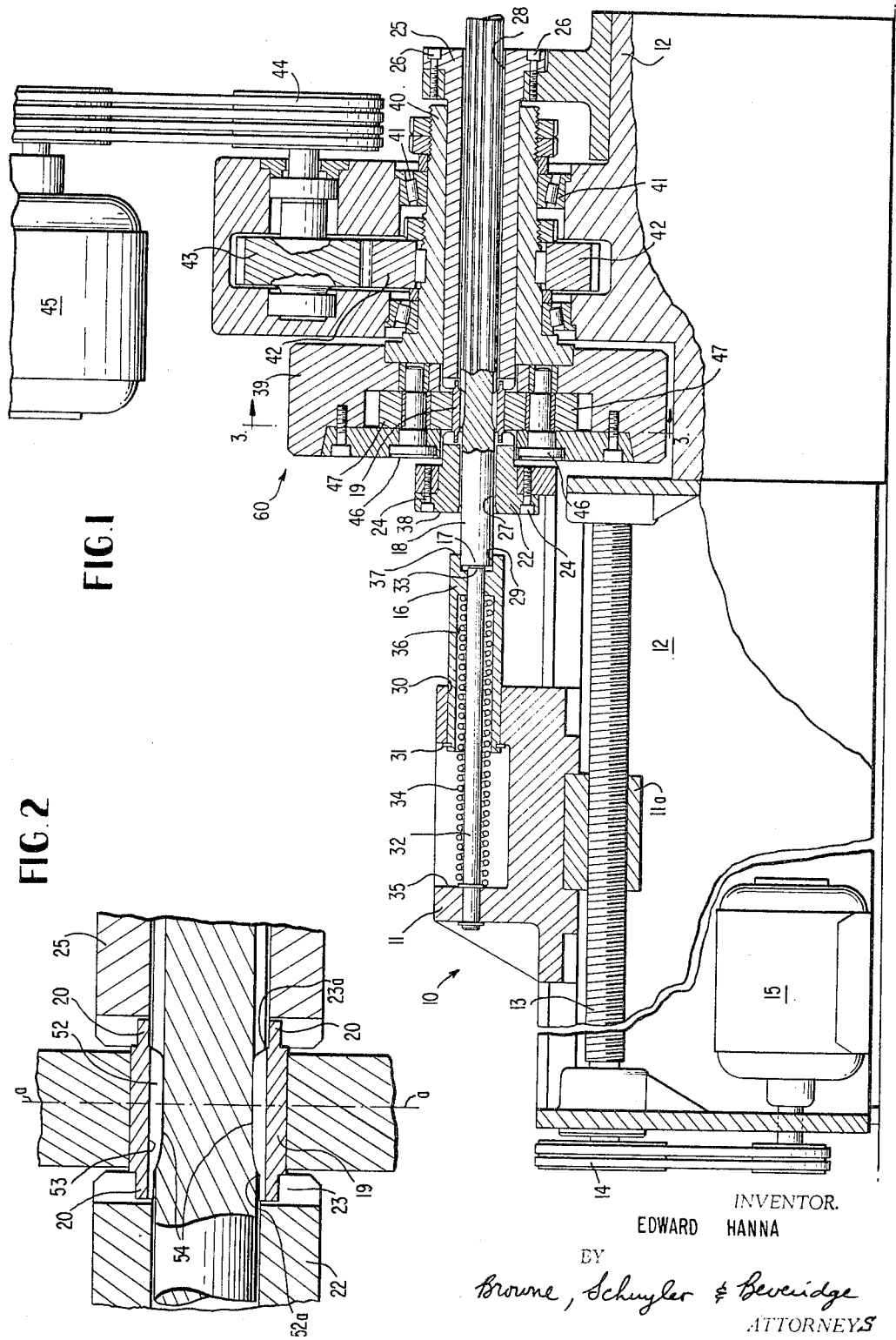
INVENTOR.
EDWARD HANNA
BY
Browne, Schuyler & Beveridge
ATTORNEYS

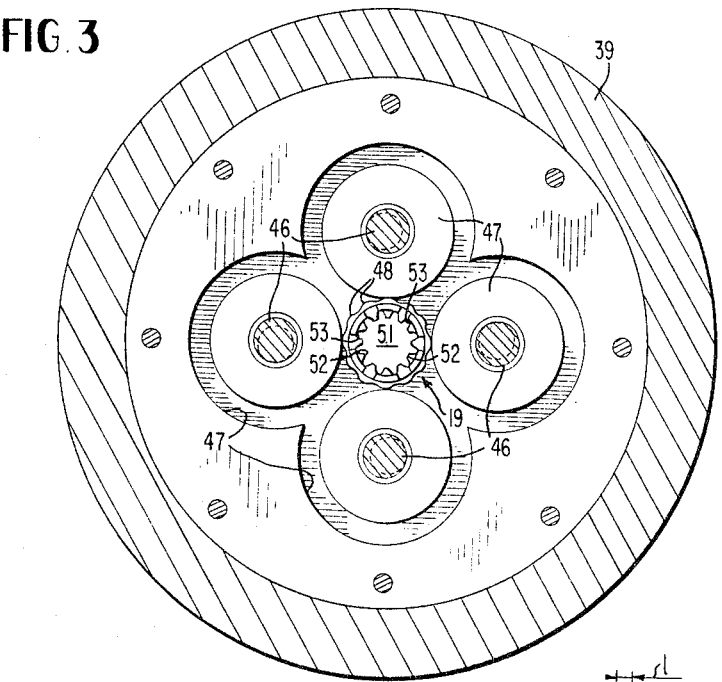
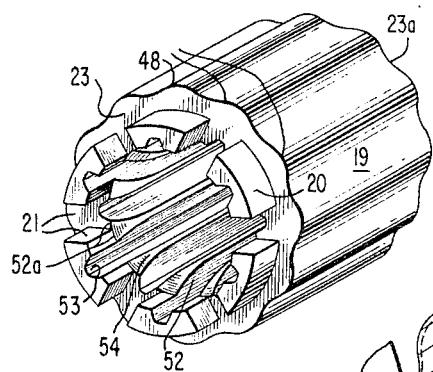
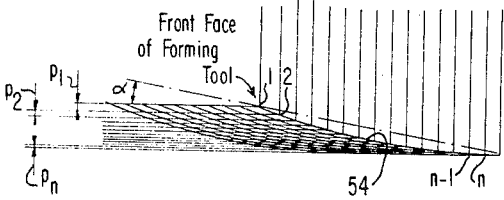
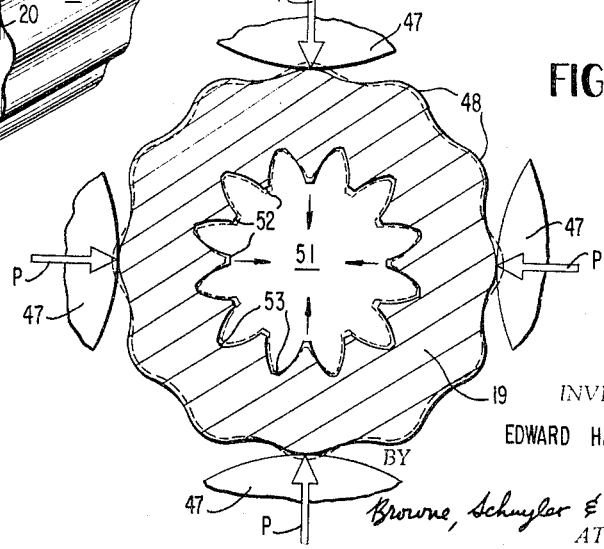

Nov. 1, 1966  E. HANNA  3,281,925
METHOD AND APPARATUS FOR FORMING TOOTHED PARTS
Filed June 11, 1964  3 Sheets-Sheet 3
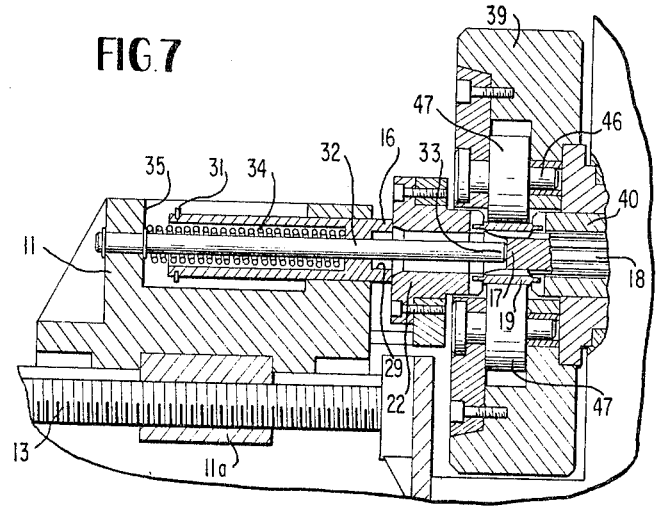
FIG.7
FIG.8  FIG.9
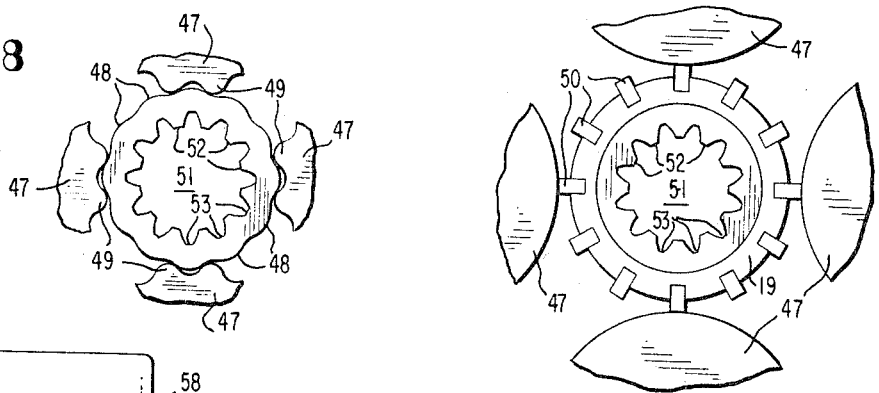
FIG.10
INVENTOR.
EDWARD HANNA
BY
Browne, Schuyler & Beveridge
ATTORNEYS

United States Patent Office 3,281,925
Patented Nov. 1, 1966

3,281,925
METHOD AND APPARATUS FOR FORMING TOOTHED PARTS
Edward Hanna, P.O. Box 358, Blue Ridge Summit, Pa.
Filed June 11, 1964, Ser. No. 374,314
19 Claims. (Cl. 29—159.2)

My invention relates to a new method and apparatus for forming toothed parts, such as splines or gears, by plastic deformation of the parts.

It is obvious that the process for forming toothed parts is essentially the same whether the part be a splined shaft, a knurled part or a gear, the primary difference being the shape and spacing of the teeth and the length of the piece. Therefore, the term "gear" will be used as a generic term covering various shaped toothed parts for purposes of simplicity of expression in this application. Accordingly, the term, gear, wherever used, is to be broadly construed to cover all parts having a toothed-shaped exterior.

Forming gears by plastic deformation of the workpiece has been widely used in lieu of cutting gears from solid stock, which latter process wastes a large amount of material and is a time consuming operation. Gear forming operations by plastic deformation of the material, sometimes known as "rolling," is most generally accomplished by the intermittent application of a radially directed force by the forming tool on the material in the workpiece tooth space dedendum, which operation is actually a swaging operation rather than a "rolling" operation. Material pressed from the tooth space dedendum is forced to flow plastically and is displaced in a manner to form the tooth addendum with the tooth profile created and controlled by the corresponding shape of the forming tools, the blank workpiece having the same mass of material as is contained in the finally formed gear.

In all present processes in machines for forming gears by plastic deformation, the workpiece is revolved about its own axis to present each tooth space in turn to a corresponding tooth on the forming tool or die. As the workpice revolves, the forming tool teeth penetrate progressively deeper, either by progressively increasing the addendum of the successive forming tool teeth, or by mechanically, progressively forcing the forming tools toward each other to reduce the distance between the forming tooth crest and the workpiece center until that distance is essentially equal to one-half the minor diameter of the formed gear.

Two basic methods are used in the present processes for forming gears by plastic deformation. In the first method, the forming tool and the workpiece cooperate gearwise. The forming tool can be in the form of a rack cooperating with the workpiece gear as a pinion, or the forming tool may be in the form of a gear which cooperates with the workpiece gear as a pinion. In both types of forming tools, penetration of the forming teeth into the workpiece is accomplished by a progressive reduction of the distance between the crest of the forming tooth on the die and the axis of the workpiece.

In the second method, the forming tool and the workpiece cooperate hob-wise. That is, the forming tool moves lengthwise relative to the longitudinal axis of the workpiece. The forming tool may be in the form of successive dies arranged around the periphery of the hob in lieu of the cutting teeth of a hob, or the forming tool may be in the form of a worm whose axis is transverse to that of the workpiece. In both types of arrangements, the forming action of the forming tool teeth is intermittent and in the longitudinal direction of the workpiece, either straight or helical, but with the forming pressure applied radially toward the central axis of the workpiece. In the latter embodiment, the forming tool is normally mounted on slides which give the tool an oscillatory-gyratory motion while the workpiece is fed lengthwise through the rolling zone of the forming hobs.

In both the first and second methods discussed above, there are no working clearances between the forming tool teeth and the workpiece tooth elements equivalent to dedendum clearance or backlash. The forming tool teeth are in extremely intimate contact with the workpiece teeth under high pressure loads and they cooperate over their entire depth.

Each of the above described processes, as may be expected, has its advantages and disadvantages. The first process is generally more limited in the type of gears it can form than the second method which has a broader range of capability but is somewhat less productive than the first method. As may be expected, both methods require expensive machines with the machines for the second type process being complex and involving complications due to the mass of the forming tools and hobs. In the worm type hobbing machine a large amount of energy is required merely to start and stop the oscillating hobbing tools and considerable energy is wasted since useful work is accomplished only during the working stroke. All present methods of rolling gears apply the forming force to either one tooth space at a time or to two essentially opposed tooth spaces at a time. Obviously, the production rate could be increased if the forming forces could be applied to more tooth spaces at one time.

Accordingly, a primary object of my invention is to devise a method and apparatus for forming gears which will have a minimum limitation on the type and configuration of the gears to be formed.

Another object is to devise a machine and apparatus for forming gears at a maximum rate of productivity.

Yet another object is to devise a method and apparatus for forming gears of maximum accuracy and quality.

A further object is to devise a machine and apparatus for forming gears at the lowest possible tooling cost.

Yet a further object is to devise an apparatus for forming gears in which the forming tools operate on more than two teeth at one time around the periphery of the workpiece.

Still yet a further object is to produce a gear forming apparatus having a minimum mass of moving tool forming parts.

In order to achieve the above objects, the ultimate in simplicity would be to force the workpiece blank through an extrusion die in the form of the gear surface of the gear. However, the hardness and malleability of materials from which gears are formed is such that the extrusion forces involved in such a process would be prohibitive.

However, the objectives have been largely achieved by utilizing a gear forming tool, or die, in the form of an annulus with a toothed shaped central opening having a cross sectional shape complementary to that of the gear surfaces. The datum diameters of the opening, i.e., minor, pitch and major, at the point of minimum cross sectional area of the opening are very slightly larger than corresponding diameters of the gear, being in the order of .002 inch, so that the finished gear will slip freely through the opening through the center of the forming tool. A workpiece of bar stock is fed axially into the central toothed opening of the annular, disk shaped forming tools while a multiplicity of rollers orbit the stationary tool to impinge on lobes or other protuberances on the olter perimeter of the tool so as to elastically flex it hoop-wise in successive sectors around its perimeter, the forming teeth of the opening constituting die surfaces being displaced radially inwardly and outwardly a small distance by the pulsing elastic deformation of the die to impact the workpiece and deform it to the desired shape. The annular die (forming tool) elastically springs back to its normal annular shape after each hoop-wise flexing deformation until the next impact of the rollers on adjacent sectors. Thus the workpiece is subjected to a type of swaging operation by the pulsating and cyclically repeating blows of the die surfaces and the surface of the workpiece is conformed to the cross sectional shape of the tooth-shaped die opening as the workpiece is fed through the forming tool. The height of the forming teeth increases along an arc from the forward face of the forming tool to the point of minimum diameter of the die opening to provide an arcuately shaped entering throat for the workpiece whose outside diameter is slightly less than the diameter of the entrance throat of the die.

All the above is explained in the detailed description of the preferred embodiments of my invention which follow and are illustrated in the accompanying drawings in which:

FIGURE 1 is a foreshortened, sectional side elevation of one embodiment of the gear forming machine of my invention.

FIGURE 2 is a fragmentary, enlarged, sectional side elevation view of the gear forming tool and immediately adjacent components.

FIGURE 3 is a view along section lines 3—3 of FIGURE 1.

FIGURE 4 is a perspective view of the gear forming tool.

FIGURE 5 is a graph representing the increments of penetration of the die surface into the workpiece material at different points along the axis of the die surfaces for equal increments of feed-through of the workpiece.

FIGURE 6 is an exaggerated, schematic, cross sectional illustration of the gear forming tool deformed under working conditions.

FIGURE 7 is a sectional elevation of that portion of the machine showing the workpiece in-feed mechanism with the bitter end of the workpiece within the forming tool.

FIGURES 8 and 9 are fragmentary cross sectional views of alternate embodiments of the gear forming tool and deforming mechanisms.

FIGURE 10 is a foreshortened, sectional side elevation of the feed-through mechanism of the machine modified to form helical gears.

One embodiment of an apparatus for manufacturing gears in accordance with the new process of my invention is illustrated in FIGURE 1. A feed slide 11 is slidably supported on a bed extension 10 carried on the front portion of the base 12 of the machine with the feed slide being moved longitudinally of the bed extension by a feed screw 13, which is rotatably mounted on the bed extension 10, rotating within the internally threaded sleeve 11a affixed to the slide 11. The feed screw 13 is connected by the pulley and belt drive assembly 14 to the motor 15 and rotated thereby. A push rod sleeve 16, mounted on the forward end of the feed slide 11, carries one end 17 of the workpiece 18, on which the gear teeth are formed, and feeds the workpiece 18 axially through the annular forming tool 19 mounted axially in line with the forward face of the push rod sleeve 16. The forming tool 19, best illustrated in FIGURE 4, has alternating castellated teeth 20 and slots 21 around the periphery of both ends which fit into complementarily shaped castellated teeth and slots of a guide bushing 22 affixed to the machine between the forward face 23 of the forming tool and the forward end of the push rod sleeve 16 by the bolted connections 24 and into complementarily shaped castellated teeth and slots on the forward face of a torque tube 25 affixed to the machine base 12 to the rear of the forming tool by the bolted connections 26. The guide bushing 22 is hollow with a central axial passage 27 and the torque tube 25 is also hollow with a longitudinally extending, axial central passage 28, both passages being in line and slightly larger in diameter than the workpiece 18 which passes longitudinally through them. Thus the guide bushing 22 and the torque tube 25 fixedly support the forming tool at its end to keep the tool from rotating and also act as guides for the workpiece as it passes through the central openings 27 and 28 within the guide bushing and torque tube.

The push rod sleeve 16 has a counter bore 29 in one end into which the end 17 of the workpiece fits and is supported. The push rod sleeve 16 is slidably mounted within a bore 30 extending through the forward section of the slide 11 to be axially movable relative to the slide, a stop collar 31 extending outwardly around the after end of the push rod sleeve to impinge on the slide at the forwardmost position of the push rod sleeve in the slide 11. A push rod 32 is affixed to the after end of the slide 11 to extend through a central portion of the hollow push rod sleeve 16 such that the forward end 33 of the push rod extends into the counter bore 29 of the push rod sleeve and contacts the end 17 of the workpiece 18. A compression spring 34 around the push rod 32 extends from the rear portion of a recess 35 in the after body of the slide 11 through the hollow central bore 36 of the push rod sleeve 16 into contact with a forward face of the bore 36 of the push rod sleeve 16 to normally position the push rod sleeve 16 in the forward position illustrated in FIGURE 1 with the stop collar 31 contacting the slide 11.

The utility of the push rod-push rod sleeve arrangement is illustrated by reference to FIGURE 7 which shows how this arrangement permits the entire length of the workpiece 18 to be fed through the forming tool 19. When the forward face 37 of the push rod sleeve 16 contacts the facing surface 38 of the guide bushing 22, as the slide 11 feeds the workpiece into the forming tool, the push rod sleeve 16 slides rearwardly within the slide 11 compressing the spring 34 and the push rod 32, which is fixed to the slide 11, moves forwardly relative to the push rod sleeve 16, the forward end 33 of the push rod remaining in contact with the workpiece 18 and continuing to feed the workpiece through the forming tool 19.

As best illustrated in FIGURE 4, the forming tool 19 is a disc-like annulus, made from hardened tool steel or similar material, with a tooth-shaped central opening 51 formed by lands 52 and grooves 53 extending between the front face 23 and the rear face 23a of the forming tool and alternating around the periphery of the opening. The cross sectional contour of each peripheral segment of this central opening at a central portion of the forming tool 19, of which the transverse plane a—a in FIGURE 2 is typical, is precisely complementary in shape to the surface of the corresponding segment of the gears, the lands 52 corresponding to the shape of the gear tooth spacings and the grooves 53 corresponding to the gear teeth formed on the workpiece. The central opening 51, defined by the outwardly projecting lands 52 and the recessed grooves 53, forms the die surfaces which form the gear teeth on the workpiece. The diameters of the opening 51 at this transverse plane of minimum cross sectional area of the opening, major pitch and minor diameters, are slightly greater than the corresponding diameters formed on the workpiece, being in the order of about .002 inch greater, or the amount by which the forming tool teeth are displaced radially inwardly by the hoop-wise deformation of the forming tool, to be subsequently explained. The height of the lands 52 decreases from the middle portion of the tool toward the forming tool front face 23 at which point 52a the distance between opposite lands is slightly larger than that of the workpiece bar stock, which is slightly larger than the pitch diameter of the gear, and acts as a bushing centering the workpiece as it is fed into the forming tool. The longitudinal profile of the top surfaces 54 of the lands extends along the curved line of an arc to form a tapered entry throat. The arc customarily is a convex circular arc but can be elliptical or any other convenient shape and a tangent at the arc terminus within the tool, where the top surfaces of the lands 52 become parallel, is customarily parallel with the central axis of the central opening 51. However, this does not preclude the arc being concave if desired. The arc is struck so that a straight line passing through the terminal ends of the arc would, if extended, intersect the central axis of the opening 51 at the throat angle $\alpha$ of between 10° to 20°, or even 30° in some instances. In many operations a circular arc establishing a throat angle $\alpha$ of 12° has been found to be optimum. The curved line 54 on the graph of FIGURE 5 represents the curved line of the top surface of each tooth with respect to the central die axis in establishing the curvature of the entry throat of the die opening 51, the significance of which will be subsequently discussed. The exterior periphery of the forming tool is scalloped with protruding cam lobes 48 extending lengthwise between faces 23 and 23a of the tool, one lobe being located on a radial of each forming tooth or land 52.

The particular forming tool illustrated in FIGURE 4 has twelve forming teeth 52 and twelve grooves 53 to form a straight spur gear with twelve teeth having a pitch diameter of 2 inches and an outside tooth diameter of 2.166 inches. The forming tool has twelve lobes located around the periphery of the tool, one each on each radial extending through each land 52. The forming tool illustrated has straight teeth parallel to its axis to form a spur gear with straight teeth for purposes of simplifying the drawing. To form helical gears, the teeth of the forming tool would be formed to angle across the axis of the forming tool at the helix angle of the gear.

A rotatable head stock 60, positioned ahead of the bed extension 10 and driven by a motor 45, rotates about the forming tool 19 and the torque tube 25, the headstock comprising a roller head 39 arranged concentrically around the forming tool 19 with an extension shaft 40 extending from the rear of the roller head 39 being rotatably supported on the base 12 by bearings 41 and extending concentrically around the fixed torque tube 25. The head stock assembly 60 is rotatable about the longitudinal axis of the torque tube 25 and workpiece 18 by the gear 42 affixed around the extension shaft 40 and meshing with a driving gear 43 connected by a shafting and pulley belt arrangement 44 to the driving motor 45. Four oppositely mounted circular rollers 47 are each rotatably mounted within the roller head 39 by eccentric pins 46 extending through the center of the rollers 47 and into the roller head 39, the exterior of each of the rollers 47 contacting the lobes 48 extending around the exterior periphery of the forming tool 19 (see FIGURE 3). The eccentric pins 46 allow for a small radial adjustment of the rollers 47 within the roller head 39. The separation between opposing rollers is adjusted so that their adjacent exterior surfaces are separated by slightly less than the maximum diameter of the forming tool across its lobes and, in orbiting about the stationary forming tool, contact the lobes 48 in a manner to flex the forming tool 19 hoop-wise as will be discussed in more detail subsequently.

The embodiment illustrated of the four oppositely mounted rollers 47 is not essential and is merely illustrative of one embodiment which can be used to deform the forming tool. The four rollers illustrated could be used with any forming tool having four lobes or multiples of four. If the forming tool has three lobes, or multiples of three, such that the lobes are not diametrically opposed, three rollers spaced around the periphery of the forming tool at 120° increments of arc would be suitable. In case the forming tool had five lobes, or multiples of five, three rollers could be utilized spaced around the pheriphery of the forming tool and separated by 144°, 72° and 144° of arc, respectively. As will be evident from the subsequent discussion, the number and location of the rollers is dependent upon the number of teeth to be formed on the workpiece, and the spacing and number of rollers is such as to create repetitive symmetrical hoop-wise elastic deformation of the forming tool in different sectors around the perimeter of the forming tool.

FIGURE 8 illustrates another alternative shape which the rollers could take when, in certain combinations of diameter and number of teeth, the peripheral distance between lobes might become so small that a large diameter roller would have a tendency to bridge the valley between the successive lobes of the forming tool and the radial displacement inwardly of the lobes would be inadequate to sufficiently flex the forming tool an adequate amount. In this situation the periphery of the pressure rollers 47 could be formed with lobes 49 conjugate with the lobes 48 of the forming tool so that the pressure rollers, when orbiting around the stationary forming tool 19, will contact the lobes of the froming tool gear wise in the manner of an idler planet pinion. FIGURE 9 illustrates another embodiment, alternative to that of FIGURE 8, to solve the same problem wherein the rollers 47 would have a tendency to bridge the valley between the lobes 48 of the forming tool 19. In the embodiment of FIGURE 9, the forming tool 19 has blades 50 radially arranged around its periphery to extend slightly outwardly so that the orbiting rollers 47 contacting the blades 50 will flex the forming tool 19 hoop-wise. Obviously, in this embodiment, the distance between opposing surfaces of the rollers 47 is slightly less than the maximum distance between opposing surfaces of blades 50 located on opposite sides of the forming tool 19.

In forming helical gears, the workpiece obviously must be rotated about its axis concurrently with the axial feeding motion through the forming tool. In some instances mechanical lead control of the workpiece would probably not be required, the cooperation between the helical forming teeth 52 and grooves 53 of the forming tool and the corresponding toothed contour formed in the workpiece being adequate to rotate the workpiece about its axis as it is forced by the push rod 32 through the forming tool. However, in instances where a mechanical lead control of the workpiece is necessary or desirable, means for rotatably driving the workpiece in synchronism with the axial feeding motion of the slide 11 can be incorporated as illustrated in FIGURE 10, or many other arrangements can be utilized which are commonly found in hobbing machines. In the embodiment of FIGURE 10, a push rod 55, similar to the push rod 32 in FIGURE 1, but longer, extends rearwardly of the slide 11 and has splines 56 on the outer end which fit within and are slidably keyed to the gear 57 meshing with gearing of a gear speed control unit 58 affixed to the machine base 12, the speed control unit 58 in turn being driven by the gear train 61 meshing with the spur gear 62 mounted on an extension shaft 63 of the worm gear 13 so that the push rod 55 and workpiece 18a are axially rotated at an angular speed synchronized with that of the worm gear 13 and slide 11. The speed ratio between the linear movement of the slide 11 and the rotational movement of the workpiece 18a may be modified by adjusting the speed control unit 58. The end 59 of the push rod 55 in contact with the workpiece 18a is squared and fits within a similarily shaped squared recess in the end of the workpiece 18a. The arrangement of the push rod sleeve 16, spring 34, slide 11 and the remainder of the structure is essentially the same as previously described for the embodiment of FIGURE 1.

The operation by which a toothed contour is formed on the workpiece 18 is best understood by referring to FIGURE 6. In this figure, which greatly exaggerates the deformation of the forming tool, the dotted lines of the outer periphery and of the toothed contour of the inner opening 51 illustrate the shape of the cross sectional contour of the forming tool 19 when the rollers 47 lie in the valleys between the lobes 48 and the forming tool is unstressed. When the four opposing rollers 47 are rotated to a position to engage and press inwardly on the opposing lobes 48 of the forming tool, since the distance between the surfaces of the opposing roller is slightly less than the diameter of the forming tool across the lobes, the annular forming tool will be elastically flexed hoop-wise by the forces of the rollers (represented by the arrows P in FIGURE 6) to form the out-of-round shape illustrated by the solid lines of FIGURE 6. This elastic or flexing deformation of the forming tool displaces the lands 52, which are immediately under each lobe 48 in contact with a roller 47, radially inwardly into contact with the surface of the workpiece to impress the surface of the workpiece in the area of the tooth spacing with the shape of the forming tooth 52.

As the rollers 47 rotate and pass off the surface of the lobes 48, the annular forming tool elastically restores to its normal unstressed shape (dotted lines in FIGURE 6) which relieves the contact and pressure of the forming tool die teeth 52 on the workpiece. As the rollers orbit about the forming tool, the tool is repeatedly flexed hoop-wise in adjoining sectors in a pulsating manner around the periphery of the forming tool. Thus the contour of each forming tooth, or land 52, is impressed on the surface of the workpiece by repeated sharp impacts of the die surfaces defining the opening 51 of the forming tool and the material of the workpiece in the area of the tooth spacing is gradually displaced into the area of the gear teeth on the workpiece. Concurrently with the orbiting of the rollers 47 and the radial deformation of the forming tool 19, the workpiece 18 is fed axially through the forming tool by the motion of the slide 11 and push rod 32. Thus, what might be identified as a type of specialized swaging operation is actually performed on the workpiece 18 in which material of the workpiece contacted by the inwardly displaced forming teeth 52 of the forming tool die 19 is displaced gradually and forced into the grooves 53 of the forming tool. The entire length of the workpiece emerging from the forming tool will have the toothed contour of the forming tool impressed on its surface. Gears of a desired length may be produced by cutting the finished workpiece into lengths.

The tapered arcuate throat configuration 54 of the forming tool die surfaces in the direction of the central axis of the tool establishes a diminishing penetration increment of the die surfaces for each equal through feed increment of the workpiece as each portion of the workpiece moves into the forming tool from the front face 23. Thus, for each increment of through feed of the workpiece (for example .001 inch) the penetration of the forming tool die surfaces (the lands 52) into the workpiece will gradually diminish from the front face 23 of the forming tool to the plane of minimum cross sectional area of the tool. FIGURE 5 illustrates this result stemming from the arcuately shaped throat of the die in which the horizontal equal increments of spacing "1" represent equal increments of feed through of the workpiece as it is forced through the forming tool at a constant speed. The vertical unequal increments "$p$," along the left of FIGURE 6, represent the penetration increments of the die surfaces into the material of the workpiece for each increment "1" of feed through motion at each point increment of feed through along the throat 54 of the forming tool represented by the points 1, 2 . . . $n-1$, $n$ at which the various horizontal increments of "1" intersect the throat contour 54. Obviously, after the material of the workpiece reaches the point of minimum cross sectional diameter of the tapered throat of the forming die, the penetration of the die surfaces is zero.

The tapered throat configuration and the results achieved are important as the amount of material displaced in a given area of the workpiece by successive blows of the forming tool teeth is cumulative. In other words, a given amount of material is displaced by the impact and penetration $d_1$ of the die teeth 52 as the workpiece passes the front face 23 of the forming tool. At the next impact on that particular section of the workpiece, as it moves into the throat by an increment "1," the amount of material previously displaced by the penetration $d_1$ of the die surface is again displaced by the diminished penetration $d_2$ of the die surface and in addition a new increment of material is displaced by the penetration $d_2$. As that same portion of the workpiece approaches the apex of the throat of the forming tool, the amount of penetration "$p_n$" is very small, approaching zero, for the increment of feed through "1" of the workpiece although the amount of material displaced by the penetration "$p_n$" is many times greater than the amount of material displaced by the initial penetration $d_1$ of the toothed die surface at the entrance of the forming tool throat. I have found that the throat angle should be approximately between 10 and 20° for best results, with 12° being an optimum angle for most operations.

The production capabilities of the illustrated embodiment are excellent. The four rollers orbiting the forming die at 1,000 r.p.m. a practical speed, cause each roller to strike 12 blows on the forming die per revolution, making a total of 48,000 blows per minute for the four rollers or 800 forming blows per second. Such a high frequency of forming blows will provide a high rate of capacity which would not be possible with many conventional gear rolling machines due to the large mass of the forming tool and the energy required for their movement.

It should be clearly understood that the illustrated embodiment utilizing orbiting rollers impinging on protuberances on the perimeter of the annular forming tool is not the only possible means by which the forming tool may be pulsed to obtain the repeated inward radial displacements of the forming teeth. A number of other mechanical arrangements could be utilized to obtain the necessary hoop-wise deformation of the annular forming tool. It is also clearly conceivable that the annular forming tool could be pulsatingly flexed to cause opposing forming teeth to be displaced radially inwardly by electrical energy directly or via a fluid transducer. One possibility would be to provide a pulsatory compression of the annular forming tool by magnetic fields such as those established by the Magneform tool developed by the General Dynamics General Atomics Division briefly described on page 73 of the May 8, 1964, issue of Time Magazine.

Although the above discussion has discussed the formation of a toothed contour on a length of bar stock (workpiece) which is fed through the forming tool and then cut into lengths to produce gears of the desired width, the method and apparatus of my invention are not limited to the production of gears cut from a long bar fed lengthwise through the forming tool or die. Bars or short lengths of workpiece material can be fed into the forming tool for the distance required to form the desired length of gearing and then withdrawing the piece from the face of the forming tool. Another alternative procedure would be to assemble a cluster of bored gear blanks on an arbor and then feeding the assembly through the machine to form a multiplicity of toothed parts or gears.

While the above matter describes and illustrates preferred embodiments and methods of my invention, it should be understood that the invention is not restricted solely to the described embodiments and methods, but that it covers all modifications which would be apparent to one skilled in the art which fall within the spirit and scope of the invention.

What is claimed is:

1. A method of forming a toothed contour on a workpiece by plastically deforming the workpiece, said method comprising the steps of:

feeding an unformed workpiece axially through the central opening of an integral, continuous annulus in which said opening has a tooth-shaped cross sectional contour having each peripheral segment complementary to a corresponding segment of the contoured workpiece, and alternately applying and releasing an inwardly directed force on opposing segments of said annulus to flex it elastically and displace opposing segments of said tooth-shaped opening radially around the periphery into and out of deforming contact with said workpiece, whereby repeated impact of all sectors of surfaces defining said tooth-shaped opening deforms the exterior of said workpiece as it is fed through said opening and conforms the surface of said workpiece to the toothed contour of said opening.

2. The method of claim 1 wherein the height of the teeth of said opening increases axially along the length of said opening from a minimum at the forward face of said annulus to establish an entrance throat of decreasing cross sectional area into which the workpiece is fed.

3. The method of claim 1 wherein said inwardly directed forces are alternately applied and released to opposed segments of said annulus in different sectors around the periphery of said annulus to elastically deform said annulus hoop-wise, cyclically in different sectors around its entire perimeter.

4. The method of producing gears by forming a contoured workpiece in accordance with claim 3 and cutting lengths from said contoured workpiece conforming to the thickness of each gear.

5. The method of claim 1 wherein the cross-sectional area and diameter of the opening in said annulus varies between opposite faces and the contour of each segment of said opening is complemental to a corresponding segment of the contoured workpiece in the plane of the annulus in which said opening has a minimum cross sectional area.

6. A method of forming gear-like tooth contours on a workpiece by plastically deforming the workpiece, said method comprising the steps of:

longitudinally feeding an unformed workpiece axially through an annular passage of tooth-shaped cross-sectional contour peripherally defined by an array of die surfaces arranged radially about a central axis to have alternating die surfaces projecting downwardly and forming teeth extending along said axis, the cross sectional contour of each peripheral segment of said passage at the plane of minimum cross sectional area being complementary in shape to a corresponding segment of said contoured workpiece with the downwardly projecting die teeth decreasing in height from said minimum cross sectional plane to the forward face of said array to form an arcuately curved throat within said passage, concurrently with said feeding operation, simultaneously displacing opposing die surfaces elastically radially inwardly an established distance into contact with said workpiece and immediately thereafter displacing said die surfaces elastically outwardly away from contact with said workpiece, and continuing said radial displacement of opposing die surfaces in different adjacent sectors sequentially around the periphery of said passage to repeatedly, radially displace said opposing die surfaces by equal increments around the periphery of said passage while said workpiece passes therethrough, whereby said workpiece is deformed by the repeated impact of said die surfaces to the contour of said passage by constantly diminishing increments of penetration of said die surfaces at each segment of said throat from the forward face of said array to said passage minimal cross sectional area for equal increments of axial movement of said workpiece through said passage.

7. An apparatus for forming a toothed-contour on the exterior of a workpiece by plastically deforming the workpiece, said apparatus comprising, an integral, continuous, elastic annular forming tool having a tooth-shaped central opening in which the cross sectional contour of each peripheral segment is complementary to a corresponding segment of the contoured workpiece, means for repetitively, elastically, flexing opposing segments of said tool radially to displace opposing segments of said central opening radially inwardly and outwardly, and means for passing the workpiece axially through said central opening, whereby the workpiece passing through said tool is repeatedly impacted and penetrated by opposing surfaces defining said opening to plastically deform the workpiece surfaces to the toothed contour of said opening.

8. The apparatus of claim 7 wherein the height of the teeth of said opening increases axially along the length of said opening from a minimum at the forward face of said annulus to establish an entrance throat of decreasing cross sectional area through which the workpiece passes.

9. The apparatus of claim 7 wherein said flexing means radially flexes opposing segments of different sectors of said tool in sequence around its perimeter.

10. The apparatus of claim 9 wherein said tool has a plurality of protuberances spaced apart about its outer periphery, and said flexing means includes a plurality of rollers positioned at spaced intervals about a circular path concentric with the central axis of said tool opening, with the roller surfaces nearest the tool being spaced from said central axis less than the distance between the outer surface of said protuberances and said central axis but greater than the distance between the outer surface of said tool between protuberances and said central axis, and means for orbiting said rollers around said circular path into contact with said protuberances.

11. The apparatus of claim 9 wherein said central opening is peripherally defined by a plurality of radially projecting teeth spaced peripherally of the opening with each tooth extending between faces of said tool and gradually increasing in height along an arc from the forward tool face to a plane of minimal cross sectional area of said opening with the top surfaces of said teeth establishing an arcuate contour and a tapered entry throat into which the workpiece is fed and said workpiece passing means includes means for passing said workpiece into said throat and through said passage in a timed relation to said tool flexing operations.

12. The apparatus of claim 11 wherein the arc along said throat is between 10° and 20°.

13. The apparatus of claim 11 wherein the arc along said throat is substantially 12°.

14. An apparatus for forming a toothed contour on a workpiece by plastically deforming the workpiece, said apparatus comprising:

die surfaces arranged in an integral, elastic circular array extending radially about a central axis to define a central passage having a longitudinally extending tooth-shaped contour, said passage having a cross sectional contour at one transverse plane of minimum area in which each peripheral segment of said die surface is complementary to a corresponding segment of the contoured workpiece, said passage being peripherally defined by die surface segments of which inwardly projecting sections form the spacing between the teeth of the workpiece with said projecting sections being separated by valleys in which the teeth on the workpiece are formed, the height of the top surfaces of said projecting sections above said valleys diminishing along an arc from said one plane toward the forward face of said array to form an arcuately tapered entry throat into said passage, means for feeding said workpiece axially through said passage, and means for repetitively displacing in sequence different opposing portions of said die surfaces a fixed distance radially of said passage around its circumference into and out of deforming contact with said workpiece, whereby the workpiece is repeatedly impacted with decreasing penetrations of said die surfaces for equal increments of said movement of said workpiece through said passage from the forward face of said array to the transverse plane of minimal passage cross sectional area and the workpiece surfaces are conformed to the toothed contour of said passage.

15. A forming tool for plastically deforming a workpiece to form a toothed contour on a workpiece passed axially through a tooth-shaped opening in said tool, said tool comprising:

an integral, continuous, elastic annulus having a tooth-shaped central opening of which the cross sectional contour of each peripheral segment is complementary to a corresponding segment of the contoured workpiece, said opening being peripherally defined by a plurality of radially inwardly projecting segments spaced around the periphery of said opening and extending between the faces of said annulus, said projecting segments forming the space between the teeth on the contoured workpiece and being separated by valleys in which the teeth of the contoured workpiece are formed, and said annulus having its outer peripheral portion adapted for cooperation with means for applying inwardly directed pressure to opposing sectors and elastically deforming said annulus radially.

16. The tool of claim 15 wherein the height of the teeth of said opening increases axially along the length of said opening from a minimum at the forward face of said annulus to establish an entrance throat of decreasing cross sectional area through which the workpiece passes.

17. The forming tool of claim 15 wherein each said projecting segment extends between the faces of said annulus with the height of the top surface above the adjacent valley increasing from a forward face of said annulus in the direction of the other annulus face along an arc to form an arcuately tapered entry throat into said opening with the cross sectional contour of each peripheral segment of said opening at the plane of minimum cross sectional area being complementary to a corresponding segment of the contoured workpiece.

18. The forming tool of claim 17 wherein said annulus has a plurality of protuberances spaced about its outer periphery.

19. The forming tool of claim 18 wherein said protuberances are spaced such that a radial from the center of said opening through each protuberance passes through a different one of said projecting segments defining the opening.

References Cited by the Examiner
UNITED STATES PATENTS

| | | | |
|---|---|---|---|
| 874,448 | 12/1907 | Smith | 29—159.2 |
| 1,922,770 | 9/1933 | Kornbrath | 72—468 |
| 1,926,141 | 9/1933 | Cross | 72—360 |
| 1,998,047 | 4/1935 | Farr | 29—523 |
| 2,174,814 | 10/1939 | Ackerman | 29—159.2 |

JOHN F. CAMPBELL, *Primary Examiner.*

THOMAS H. EAGER, *Examiner.*